US012753826B2

(12) United States Patent
Southwell

(10) Patent No.: US 12,753,826 B2
(45) Date of Patent: Oct. 6, 2026

(54) BELT TENSION ADJUSTMENT SYSTEM

(71) Applicant: HUSQVARNA AB, Huskvarna (SE)

(72) Inventor: John Southwell, Huntersville, NC (US)

(73) Assignee: HUSQVARNA AB, Huskvarna (SE)

( * ) Notice: Subject to any disclaimer, the term of this patent is extended or adjusted under 35 U.S.C. 154(b) by 37 days.

(21) Appl. No.: 18/844,677

(22) PCT Filed: Dec. 19, 2022

(86) PCT No.: PCT/US2022/053319
§ 371 (c)(1),
(2) Date: Sep. 6, 2024

(87) PCT Pub. No.: WO2023/172324
PCT Pub. Date: Sep. 14, 2023

(65) Prior Publication Data

US 2025/0180099 A1 Jun. 5, 2025

Related U.S. Application Data

(60) Provisional application No. 63/317,262, filed on Mar. 7, 2022.

(51) Int. Cl.
*F16H 7/08* (2006.01)
*A01D 34/64* (2006.01)
(Continued)

(52) U.S. Cl.
CPC ............... *F16H 7/08* (2013.01); *A01D 34/64* (2013.01); *A01D 34/76* (2013.01);
(Continued)

(58) Field of Classification Search
CPC ............... F16H 7/08; F16H 2007/0893; F16H 2007/0897; F16H 2007/087;
(Continued)

(56) References Cited

U.S. PATENT DOCUMENTS 3,766,722 A * 10/1973 Kamlukin .............. A01D 69/00 56/11.6
3,785,085 A * 1/1974 Peroni .................... A63H 17/18 180/7.4

(Continued)

FOREIGN PATENT DOCUMENTS

JP S5981326 U 6/1984
JP 4551748 B2 9/2010

OTHER PUBLICATIONS

International Search Report and Written Opinion for International Application No. PCT/US2022/053319 mailed Mar. 20, 2023.

(Continued)

*Primary Examiner* — Henry Y Liu
(74) *Attorney, Agent, or Firm* — Burr & Forman

(57) ABSTRACT

A belt tensioning assembly may include a drive belt which may be configured to transfer torque from an engine, a pulley assembly which may guide the drive belt, a pulley adjustment arm which may be configured to move at least one pulley from the pulley assembly to adjust the tension level of the drive belt, a tension keeping assembly which may set and maintain a desired level of tension in the drive belt by moving the at least one pulley, and an interface assembly which may operably couple the tension keeping assembly to the pulley adjustment arm. The tension keeping assembly may include a setting portion at which the desired level of tension in the drive belt may be set and a retaining portion at which the desired level of tension in the drive belt may be maintained.

18 Claims, 8 Drawing Sheets

(51) Int. Cl.
*A01D 34/76* (2006.01)
*A01D 101/00* (2006.01)

(52) U.S. Cl.
CPC .. *A01D 2101/00* (2013.01); *F16H 2007/0808* (2013.01); *F16H 2007/0865* (2013.01); *F16H 2007/0874* (2013.01); *F16H 2007/0893* (2013.01)

(58) Field of Classification Search
CPC ..... F16H 2007/0874; F16H 2007/0865; F16H 2007/0808; A01D 34/76; A01D 34/64; A01D 2101/00
USPC .......................................................... 474/101
See application file for complete search history.

(56) References Cited

U.S. PATENT DOCUMENTS

| | | | | | |
|---|---|---|---|---|---|
| 4,068,452 | A * | 1/1978 | Schaefer | A01D 69/10 | 56/11.6 |
| 4,346,547 | A * | 8/1982 | Allison | A01D 67/00 | 56/13.6 |
| 4,813,215 | A * | 3/1989 | Chase | A01D 34/76 | 56/11.6 |
| 5,012,632 | A * | 5/1991 | Kuhn | A01D 34/76 | 474/84 |
| 5,197,267 | A * | 3/1993 | Aldred | A01D 34/62 | 56/251 |
| 5,769,747 | A * | 6/1998 | Kuhn | A01D 34/6806 | 474/138 |
| 6,162,141 | A * | 12/2000 | Rointru | F16H 7/1209 | 474/190 |
| 6,176,071 | B1 * | 1/2001 | Thorman | F16H 7/1281 | 474/135 |
| 6,312,352 | B1 * | 11/2001 | Holland | F16H 7/1281 | 56/11.6 |
| 6,334,292 | B1 * | 1/2002 | Walch | F16H 7/1281 | 56/11.6 |
| 6,484,486 | B2 * | 11/2002 | Nagai | A01D 43/0635 | 56/16.8 |
| 6,578,349 | B2 * | 6/2003 | Buss | A01D 34/76 | 56/11.6 |
| 6,602,155 | B2 * | 8/2003 | Buss | A01D 34/76 | 474/138 |
| 6,931,825 | B2 * | 8/2005 | Stineman | A01D 34/82 | 56/6 |
| 6,952,913 | B1 * | 10/2005 | Crumly | A01D 34/76 | 56/11.6 |
| 7,553,248 | B2 * | 6/2009 | Busboom | A01D 69/10 | 474/134 |
| 7,665,284 | B1 * | 2/2010 | Funk | A01D 34/76 | 474/62 |
| 7,856,799 | B1 * | 12/2010 | Funk | A01D 34/76 | 474/62 |
| 8,060,968 | B2 * | 11/2011 | Babb | E03F 9/002 | 474/135 |
| 8,567,166 | B2 * | 10/2013 | Minoura | A01D 69/06 | 56/11.6 |
| 8,701,377 | B1 * | 4/2014 | Wadzinski | A01D 34/667 | 56/320.1 |
| 9,409,589 | B2 * | 8/2016 | Oswald | A01D 34/001 | |
| 9,699,965 | B2 * | 7/2017 | Schygge | B60L 50/66 | |
| 9,730,383 | B2 * | 8/2017 | Greulich | F16H 7/1281 | |
| 9,939,052 | B2 * | 4/2018 | Bailliu | F16H 9/04 | |
| 11,009,105 | B2 * | 5/2021 | Veer | F16H 7/06 | |
| 11,365,788 | B2 * | 6/2022 | Quintanilla Salas | F16H 7/02 | |
| 11,499,607 | B2 * | 11/2022 | Koka | F24F 11/77 | |
| 11,578,787 | B2 * | 2/2023 | Veer | F16H 7/12 | |
| 11,758,843 | B2 * | 9/2023 | Fergus | A01D 34/76 | 56/11.6 |
| 11,773,945 | B2 * | 10/2023 | Veer | A01D 69/00 | 474/135 |
| 12,302,784 | B1 * | 5/2025 | Crowl | F16H 7/20 | |
| 2016/0311458 | A1 * | 10/2016 | Oswald | A01D 42/00 | |

OTHER PUBLICATIONS

Continental Aftermarket, “Watch and Work—Opel Astra 1 8 16 V”, Sep. 9, 2016, Retrieved from the Internet: URL:https://www.youtube.com/watch?v=8Z3TKbLJvzU.

* cited by examiner

BELT TENSION ADJUSTMENT SYSTEM

TECHNICAL FIELD

Example embodiments generally relate to lawn care vehicles with a belt driven cutting deck and, more particularly, to a belt tension adjustment system for adjusting the tension in the drive belt of such a lawn care vehicle.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as zero turn mowers and lawn tractors, can be quite large. Riding lawn mowers provide the convenience of a riding vehicle as well as a typically larger cutting deck as compared to a walk-behind model. Similarly, riding lawn care vehicles typically provide users with increased convenience by enabling them to perform the yard maintenance tasks faster without exerting effort to push or walk with a vehicle.

As can be appreciated from the description above, riding lawn care vehicles may come in many different sizes and may have wide variances in their capabilities. However, beyond mere changes in size and function, riding lawn care vehicles can also be produced with a great deal of precision in relation to the configurations via which various ones of the functions they can perform are provided. For example, some riding yard maintenance vehicles may have cutting decks mounted between the front and rear wheels and may use a drive belt to transfer torque from the engine to the cutting deck in order to spin the cutting blades. Over time and through use, the drive belt may stretch and loosen, which is an undesired side effect of using a belt to transfer torque. In addition to changes in characteristics of the drive belt, changes may also happen over time in the ability of components that set belt tension to retain their original settings. Thus, it may be advantageous to provide an assembly that is capable of addressing these issues.

BRIEF SUMMARY OF SOME EXAMPLES

Some example embodiments may provide for a belt tensioning assembly. The belt tensioning assembly may include a drive belt which may be configured to transfer torque from an engine, a pulley assembly which may guide the drive belt, a pulley adjustment arm which may be configured to move at least one pulley from the pulley assembly to adjust the tension level of the drive belt, a tension keeping assembly which may set and maintain a desired level of tension in the drive belt by moving the at least one pulley, and an interface assembly which may operably couple the tension keeping assembly to the pulley adjustment arm. The tension keeping assembly may include a setting portion at which the desired level of tension in the drive belt may be set and a retaining portion at which the desired level of tension in the drive belt may be maintained.

Some example embodiments may provide for a riding lawn care vehicle. The riding lawn care vehicle may include a frame to which wheels of the riding lawn care vehicle may be attachable, an engine which may be operably coupled to the frame and may provide power to the wheels and to at least one cutting blade of the riding lawn care vehicle, a cutting deck which may be operably coupled to the frame and may include the at least one cutting blade and a drive belt that may transfer torque from the engine to the at least one cutting blade, and a belt tensioning assembly which may apply tension to the drive belt to ensure the drive belt transfers torque from the engine to the at least one cutting blade. The belt tensioning assembly may include a tension keeping assembly to set and maintain a desired level of tension in the drive belt. The tension keeping assembly may include a setting portion at which the desired level of tension in the drive belt may be set and a retaining portion at which the desired level of tension in the drive belt may be maintained.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1A:
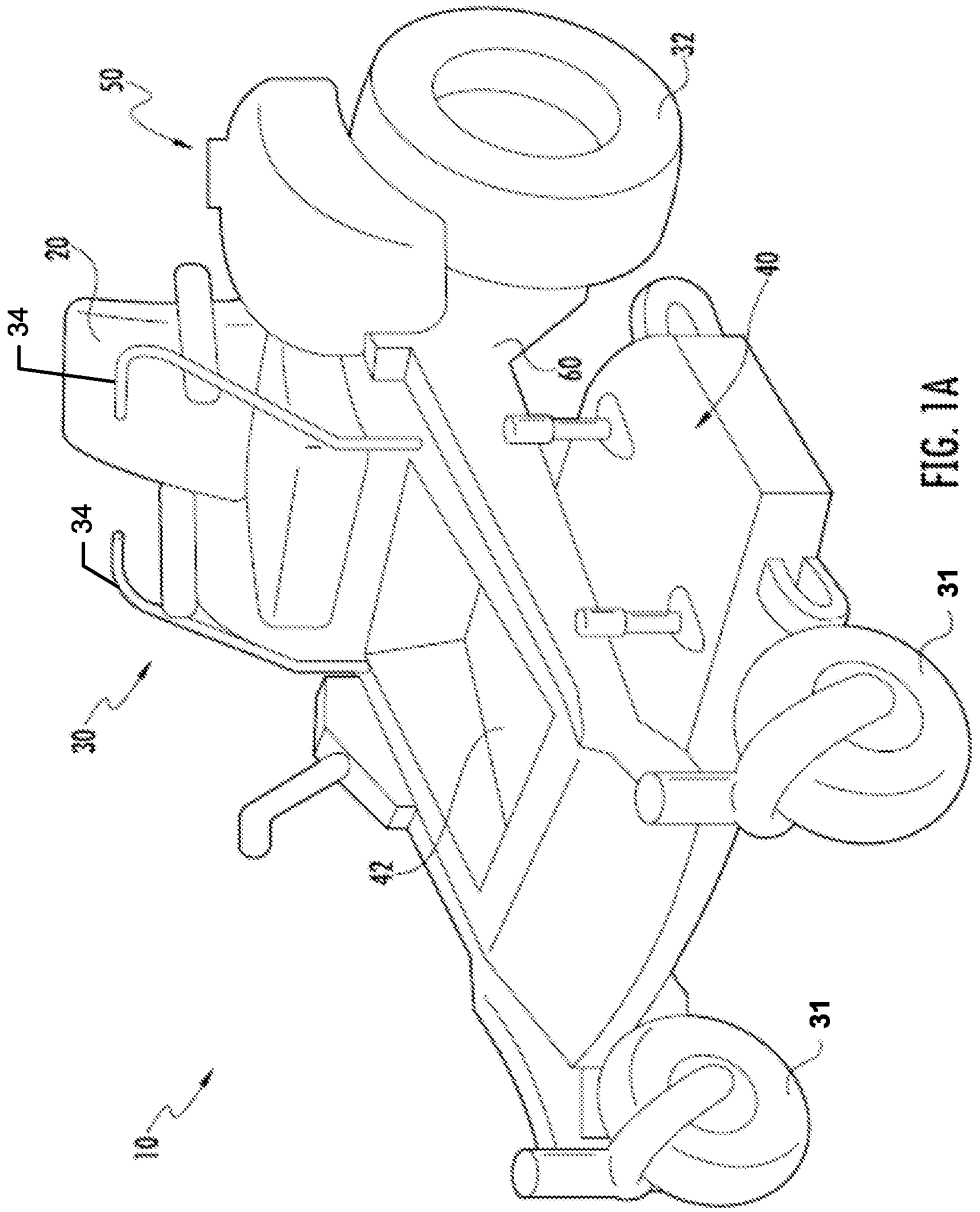
FIG. 1A illustrates a perspective view of a riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other. Although terms such as equipment, attachment, accessory and/or the like may each be used to generally interchangeably to describe components of various devices, some of these terms may be used to differentiate certain components of example embodiments for purposes of clarity.

Figure 1B:
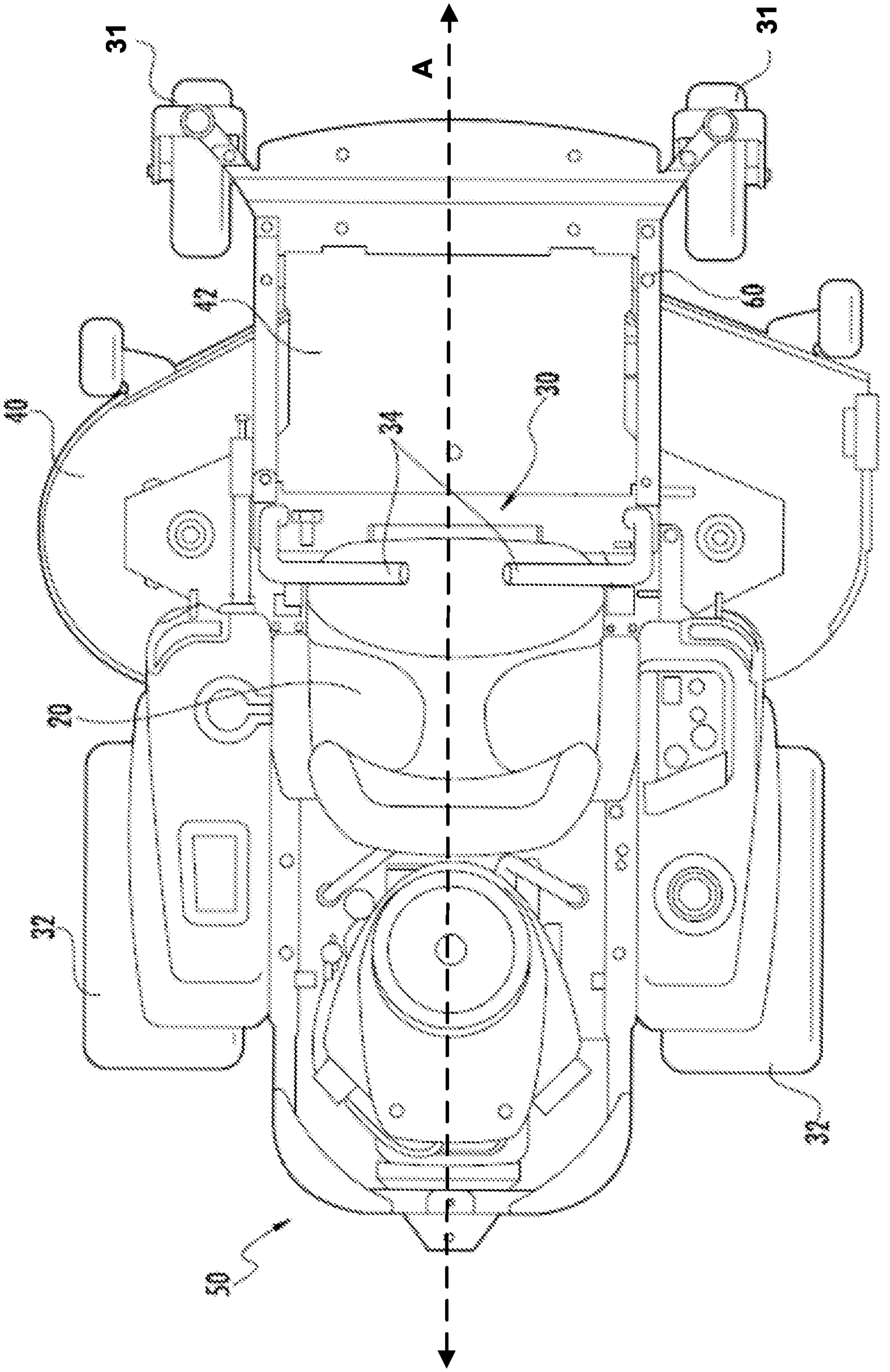
FIG. 1B illustrates a top view of the riding lawn care vehicle according to an example embodiment.

FIG. 1A illustrates a perspective view of a riding lawn care vehicle 10 and FIG. 1B illustrates a top view of the riding lawn care vehicle 10 according to an example embodiment. The riding lawn care vehicle 10 may include a seat 20 that may be disposed at a center, rear, or front portion of the riding lawn care vehicle 10. The riding lawn care vehicle 10 may also include a steering assembly 30 (e.g., a set of steering levers or the like) functionally connected to wheels 31 and/or 32 of the riding lawn care vehicle 10 to allow the operator to steer the riding lawn care vehicle 10.

In the depicted example, the operator may sit on the seat 20, which may be disposed between steering levers 34 of the steering assembly 30 to provide input for steering of the riding lawn care vehicle 10 via the steering assembly 30. The riding lawn care vehicle 10 may also include a cutting deck 40 having at least one cutting blade (e.g., three cutting blades) mounted therein. The cutting deck 40 may be positioned substantially rearward of a pair of front wheels 31 and substantially forward of a pair of rear wheels 32 in a position to enable the operator to cut grass using the cutting blade(s) when the cutting blade(s) are rotated below the cutting deck 40 when the cutting deck 40 is in a cutting position. However, example embodiments may also be applied to vehicles that have the cutting deck 40 placed forward of the front wheels 31. Moreover, example embodiments may also apply to walk behind models with belt driven cutting decks.

In some embodiments, a footrest 42 may also be positioned above the cutting deck 40 forward of the seat 20 to enable the operator to rest his or her feet thereon while seated in the seat 20. In the pictured embodiment, an engine 50 of the riding lawn care vehicle 10 is disposed to the rear of a seated operator. However, in other example embodiments, the engine 50 could be in different positions such as in front of or below the operator. The engine 50 may be operably coupled to one or more of the wheels 31 and/or 32 (in this case only to the rear wheels 32) to provide drive power for the riding lawn care vehicle 10. The engine 50, the steering assembly 30, the cutting deck 40, the seat 20, and other components of the riding lawn care vehicle 10 may be operably connected (directly or indirectly) to a frame 60 of the riding lawn care vehicle 10. The frame 60 may be a rigid structure configured to provide support, connectivity, and/or interoperability functions for various ones of the components of the riding lawn care vehicle 10.

As can be appreciated from FIG. 1A, the footrest 42 may be substantially lower (in elevation) than the seat 20 in order to comfortably support a seated operator on the seat 20. This results in an elevated seat 20 that is disposed atop a seat mounting structure that is operably coupled to the frame 60. In some embodiments, such as the one depicted in FIGS. 1A and 1B, the riding lawn care vehicle may be of the type to have a zero or near zero degree radius of turn. However, in other embodiments, other types of riding lawn care vehicles may be used.

Figure 2:
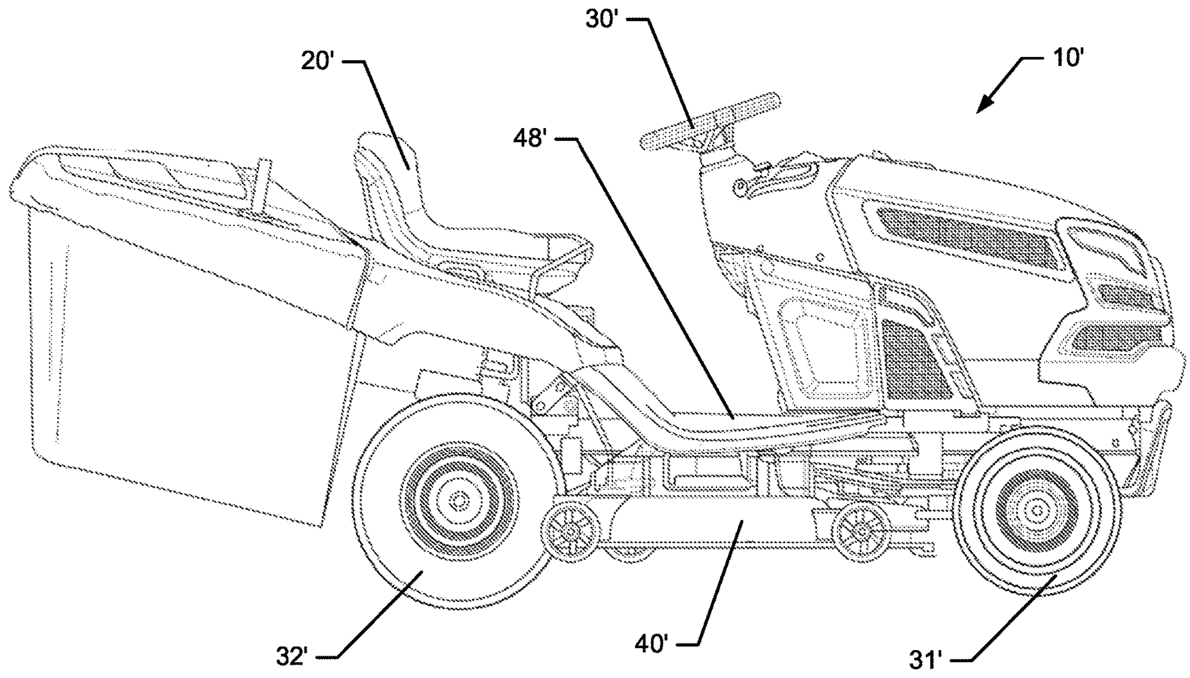
FIG. 2 illustrates a side view of the riding lawn care vehicle according to an example embodiment.

FIG. 2 illustrates a riding lawn care vehicle 10' of a lawn tractor type. The riding lawn care vehicle 10' may include a seat 20' that may be disposed at a center, rear, or front portion of the riding lawn care vehicle 10', and a steering assembly 30' (e.g., including a steering wheel, handle bars, or other steering apparatus) functionally connected to wheels 31' and/or 32' of the riding lawn care vehicle 10' to which steering inputs are provided (e.g., the front and/or rear wheels in various different embodiments) to allow the operator to steer the riding lawn care vehicle 10'. The operator may sit on the seat 20', which may be disposed to the rear of a steering assembly 30' to provide input for steering of the riding lawn care vehicle 10' via the steering assembly 30'.

The riding lawn care vehicle 10' may also include, or be configured to support attachment of, a cutting deck 40' having at least one cutting blade mounted therein. In some cases, a height of the at least one cutting blade may be adjustable by an operator of the riding lawn care vehicle 10'. The cutting deck 40' may be a fixed or removable attachment in various different embodiments. In some embodiments, the cutting deck 40' may be lifted or rotated relative to the lawn mower frame to permit easier access to the underside of the lawn mower without requiring removal of the cutting deck 40'. The cutting deck 40' may have one, two, three, or more cutting blades driven by one, two, three, or more rotatable shafts. The shafts may be rotated by any number of mechanisms. For example, in some embodiments, the shafts are coupled to a motor via a system of belts and pulleys. In other embodiments, the shafts may be coupled to the motor via a system of universal joints, gears, and/or other shafts. In still other embodiments, such as in an electric lawn mower, the shaft may extend directly from an electric motor positioned over the cutting deck.

The riding lawn care vehicle 10' may also include additional control-related components such as one or more speed controllers, brakes, cutting height adjusters, and/or the like. Some of the controllers, such as the speed controllers and/or brakes, may be provided in the form of foot pedals that may sit proximate to a footrest 48' (which may include a portion on both sides of the riding lawn care vehicle 10') to enable the operator to rest his or her feet thereon while seated in the seat 20'. In some embodiments, one such control-related component may be a cutting deck height adjustment assembly, which may include a foot pedal to lift the cutting deck away from a cutting position. More details on the deck height adjustment assembly will be discussed below in reference to later figures.

Figure 3:
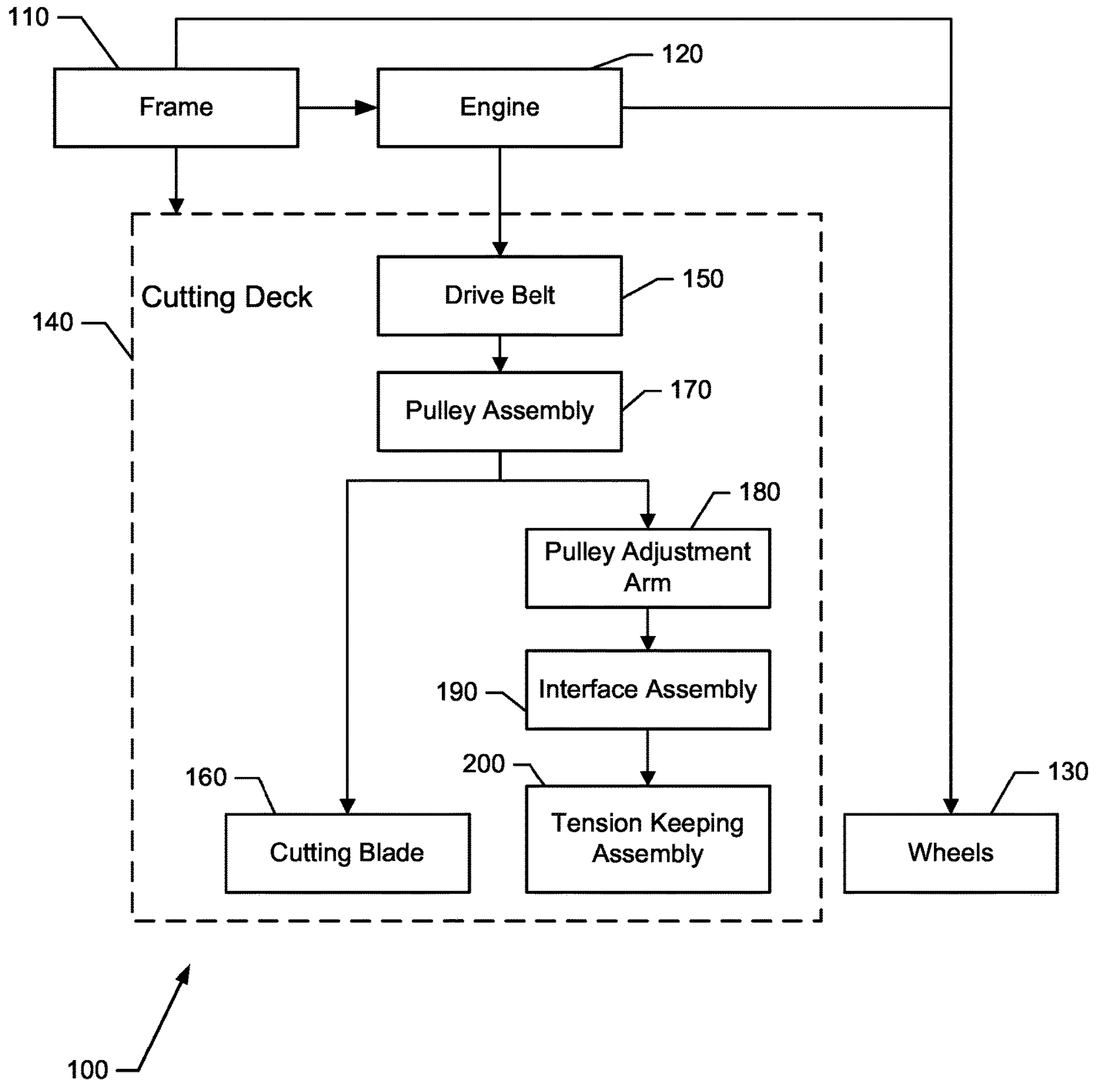
FIG. 3 illustrates a schematic block diagram of a riding lawn care vehicle according to an example embodiment.

FIG. 3 illustrates a simplified block diagram of a riding lawn care vehicle 100 according to an example embodiment. The riding lawn care vehicle 100 may be an example of either a zero turn mower (the embodiment described in FIGS. 1A and 1B), a lawn tractor (the embodiment described in FIG. 2), or any other form of lawn care equipment that employs a cutting deck with a drive belt. As shown in FIG. 3, the riding lawn care vehicle 100 may include a frame 110, an engine 120, wheels 130, and a cutting deck 140. In some embodiments, the engine 120, wheels 130 and cutting deck 140 may all be operably coupled to the frame 110, while the engine 120 may also be operably coupled to the wheels 130 and to the cutting deck 140. The cutting deck 140 may include a belt tensioning assembly operably coupled thereto that may assist with performing a cutting operation of the riding lawn care vehicle 100. In this regard, the belt tensioning assembly may include a drive belt 150, and may apply tension to the drive belt 150 so that the drive belt 150 may transfer torque from the engine 120 to the cutting blade 160. The belt tensioning assembly may further include a pulley assembly 170, a pulley adjustment arm 180, an interface assembly 190 and a tension keeping assembly 200. The drive belt 150 may operably couple the engine 120 to at least one cutting blade 160 of the cutting deck 140 in order to transfer torque produced by the engine 120 to the cutting blade 160, thereby spinning the cutting blade 160 and performing a cutting operation of the riding lawn care vehicle 100. The drive belt 150 may also be operably coupled to a shroud or housing of the cutting deck 140 via the pulley assembly 170. In this regard, the pulley assembly 170 may retain the drive belt 150 in a working orientation and may impart a specified level of tension on the belt 150. In some embodiments, the pulley assembly 170 may guide the drive belt 150 around the structures or components of the cutting deck 140 such that the drive belt 150 may rotate the individual pulleys that may comprise the pulley assembly 170. In an example embodiment, the cutting deck 140 may include two or more cutting blades 160. In this regard, the pulley assembly 170 may guide the drive belt 150 around the cutting deck 140 such that the drive belt 150 may provide torque to each cutting blade 160 (e.g., via a shaft to which each cutting blade 160 may be mounted).

The pulley adjustment arm 180 may operably couple at least one pulley from the pulley assembly 170 to the interface assembly 190. In this regard, the pulley adjustment arm 180 may bias the pulley (or pulleys) responsive to receiving a force from the interface assembly 190 to adjust the amount of tension that the pulley assembly 170 puts on the drive belt 150. The tension keeping assembly 200 may allow the operator to adjust the tension in the drive belt 150 to a desired tension threshold. The tension keeping assembly 200 may also assist with maintaining tension within the drive belt 150 after the desired tension has been selected and the pulley assembly 170 has been adjusted. Accordingly, the tension keeping assembly 200 may include a setting portion and a retaining portion. In this regard, the setting portion may set the desired level of tension of the drive belt 150, and the retaining portion may maintain the desired level of tension of the drive belt 150. Further details about the setting portion and the retaining portion of the tension keeping assembly 200 will be discussed below in relation to later figures. In some embodiments, the tension keeping assembly 200 may provide a biasing force to the interface assembly 190 which may, in turn, provide a biasing force to the pulley adjustment arm 180 in order to bias the at least one pulley in the pulley assembly 170 and thereby impart the desired tension on the drive belt 150.

Figure 4:
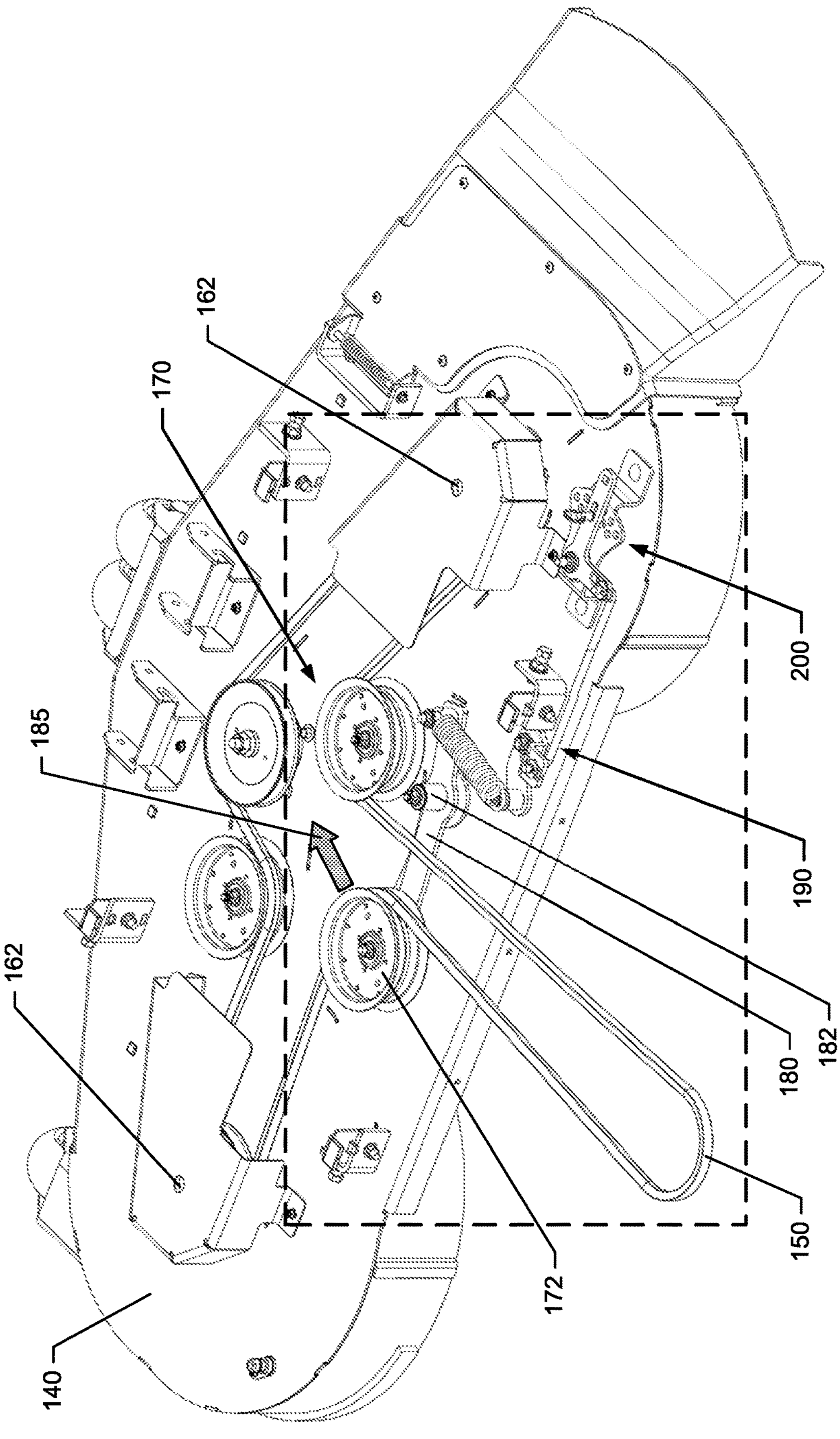
FIG. 4 illustrates a perspective view of a cutting deck according to an example embodiment.

FIG. 4 illustrates a perspective view of the cutting deck 140 according to an example embodiment. In this regard, components of the belt tensioning assembly are visible on a top surface of the cutting deck 140. Similarly, FIG. 5 depicts a close-up partial view of the components of the belt tensioning assembly, taken from the broken line box shown in FIG. 4.

Figure 5:
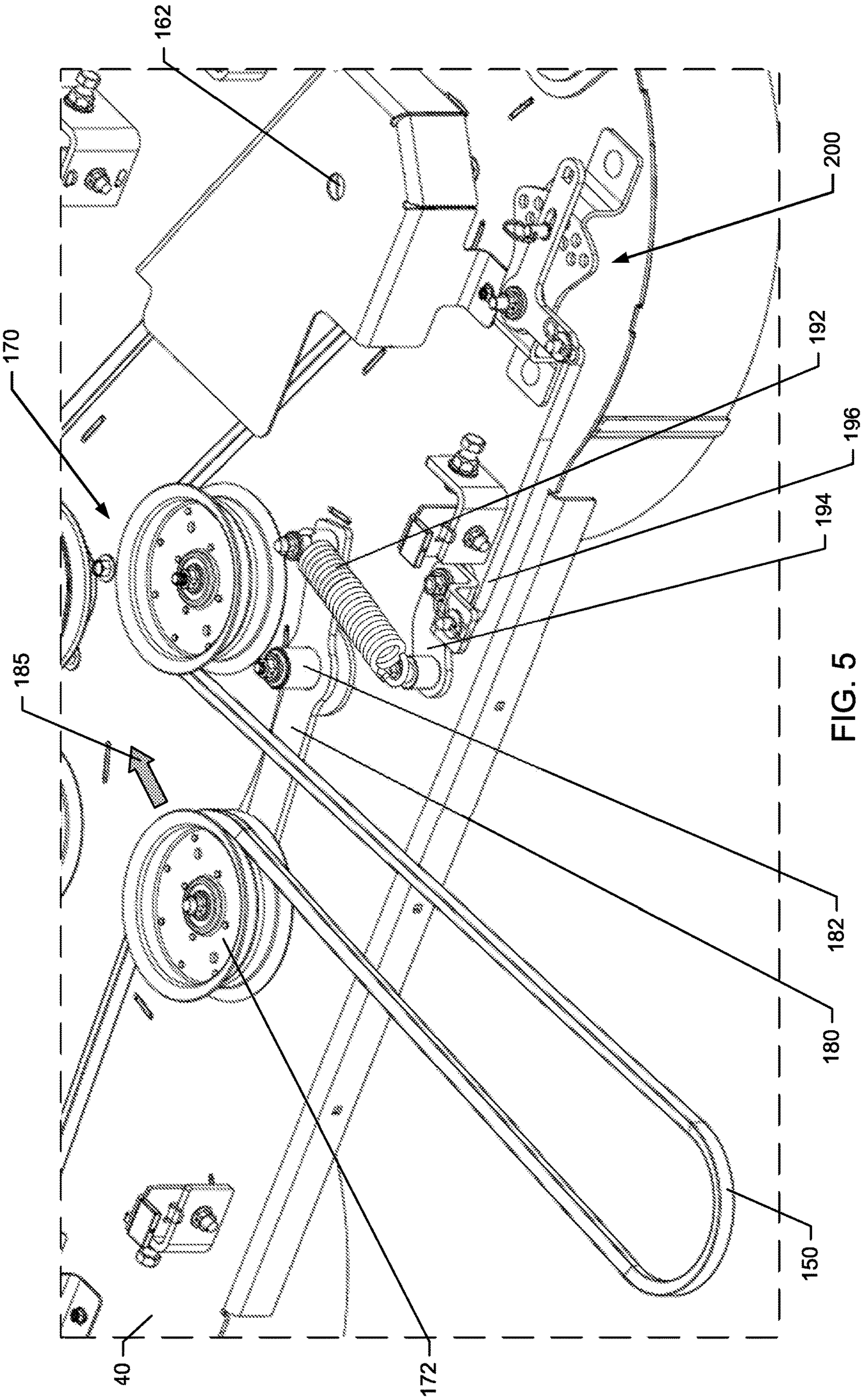
FIG. 5 illustrates a close up perspective view of the cutting deck from FIG. 4 according to an example embodiment.

Referring now to FIGS. 4 and 5, the drive belt 150 may extend towards the engine 120 (e.g., to a drive shaft operably coupled to the engine 120), and away from the cutting deck 140 and pulley assembly 170, at roughly a point halfway between a width of the cutting deck 140. In an example embodiment, the pulley assembly 170 may comprise a total of six individual pulleys. Of the six individual pulleys that make up the pulley assembly 170 of some embodiments, each cutting blade 160 of FIG. 3 may be operably coupled to an individual pulley via a blade shaft 162, and at least one other pulley (e.g. the tensioning pulley 172) may be operably coupled to the pulley adjustment arm 180. In this regard, all of the individual pulleys in the pulley assembly 170, except for the tensioning pulley 172, may be fixed at a corresponding single point with respect to the cutting deck 140. Each pulley in the pulley assembly 170 may be configured to rotate about its own axis of rotation passing through the center of each respective pulley. As mentioned above, the pulley assembly 170 may guide the drive belt 150 around the top surface of the cutting deck 140 such that the drive belt 150 is driven by the engine 120 and transfers torque to all of the individual pulleys in the pulley assembly 170 and thus also to each cutting blade 160 via the respective blade shaft 162. The drive belt 150 may therefore be comprised of an elastic or a semi-elastic material so that the drive belt 150 may be bent and pulled into a shape dictated by the pulley assembly 170, and held there for the extent of its lifetime of use. Accordingly, the drive belt 150 may naturally stretch and loosen over to time and due to the conditions of its normal use circumstances. Stretching and loosening of the drive belt 150 may adversely affect the overall performance of the cutting blade 160 of the riding lawn care vehicle 100. Thus, increasing the ease with which the tension in the drive belt 150 can be adjusted and maintained may be desirable.

As shown in the close-up of FIG. 5, the tension keeping assembly 200 may also be disposed on a top surface of the cutting deck 140. In this view, the operable coupling of the tension keeping assembly 200 with the interface assembly 190 and the pulley adjustment arm 180 is clearly visible. In this regard, the pulley adjustment arm 180 is pivotably operably coupled to the cutting deck 140 at a pivot point 182. The pulley adjustment arm 180 may also be operably coupled to the tensioning pulley 172 at a first end of the arm 180, and to the interface assembly 190 at a second end of the arm 180. The pivot point 182 of the pulley adjustment arm 180 may be disposed between the first and second ends of the pulley adjustment arm 180. In this regard, the interface assembly 190 may impart the biasing force and pull the second end of the pulley adjustment arm 180 towards the interface assembly 190, thereby rotating the pulley adjustment arm 180 about the pivot point 182 and biasing the tensioning pulley 172 in the direction of arrow 185 to apply more tension to the drive belt 150.

The interface assembly 190 may include a spring 192, a bell crank 194, and a pull rod 196. In some embodiments, the spring 192 may operably couple the second end of the pulley adjustment arm 180 to the bell crank 194, the bell crank 194 may operably couple the spring 192 to the pull rod 196, and the pull rod 196 may operably couple the bell crank 194 to the tension keeping assembly 200. In this regard, the pull rod 196 may receive a biasing force from the tension keeping assembly 200 that may bias the pull rod 196 towards the tension keeping assembly 200. Therefore, the pull rod 196 may transfer the biasing force to the bell crank 194, which may be configured to rotate about a pivot point in response to receiving the force from the pull rod 196. In this regard, the bell crank 194 may change the direction of the applied force by roughly 90 degrees, such that the motion of the pull rod 196, towards the tension keeping assembly 200, is transferred into a force applied to the spring 192 in a direction substantially perpendicular to the direction of motion of the pull rod 196. This biasing force applied to the spring 192 is therefore applied to the second end of the pulley adjustment arm 180, thereby pivoting the pulley adjustment arm 180 and applying more tension to the drive belt 150 via tensioning pulley 172.

Figure 6:
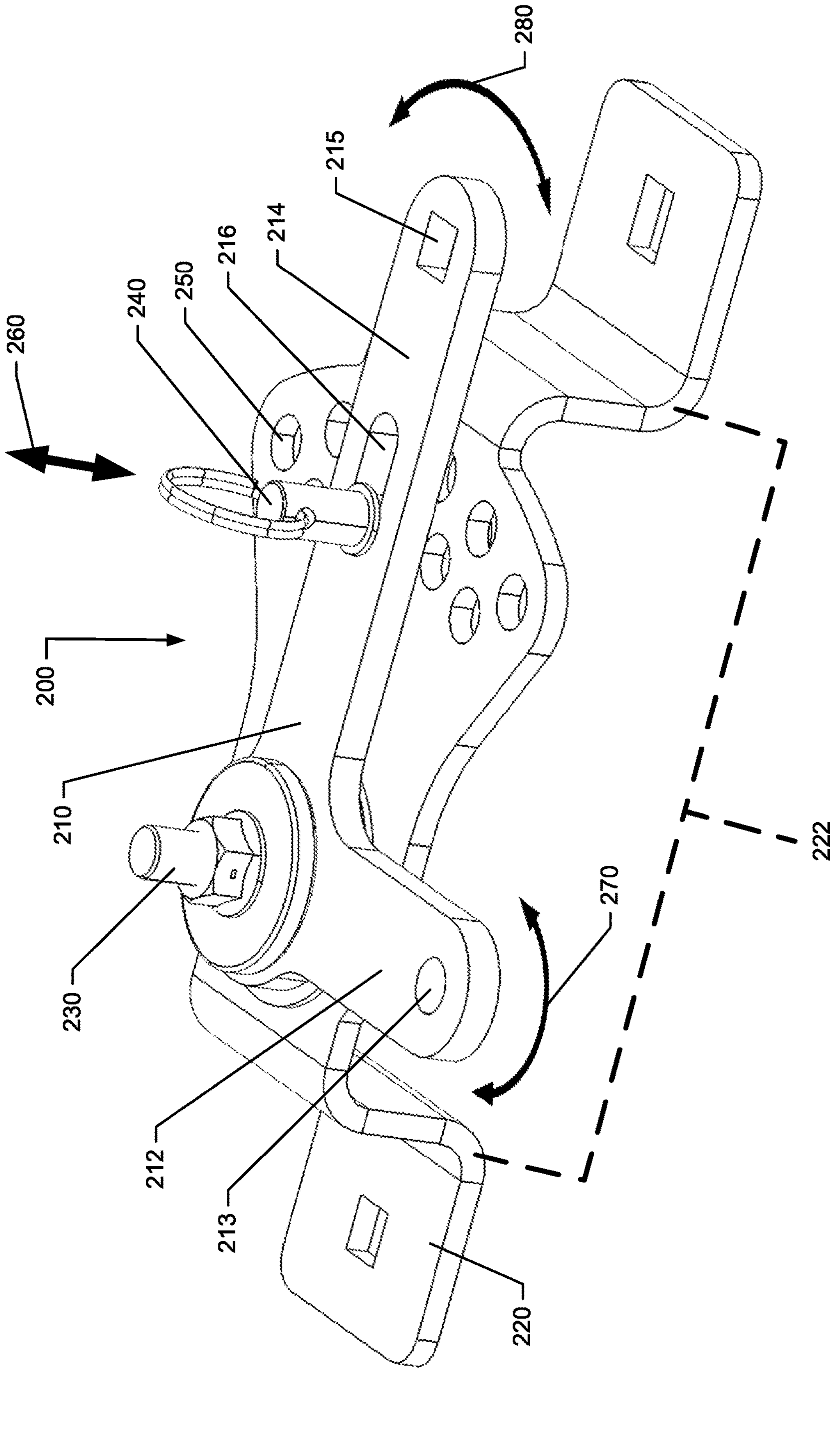
FIG. 6 illustrates a perspective view of a tension keeping assembly in isolation according to an example embodiment.
Figure 7:
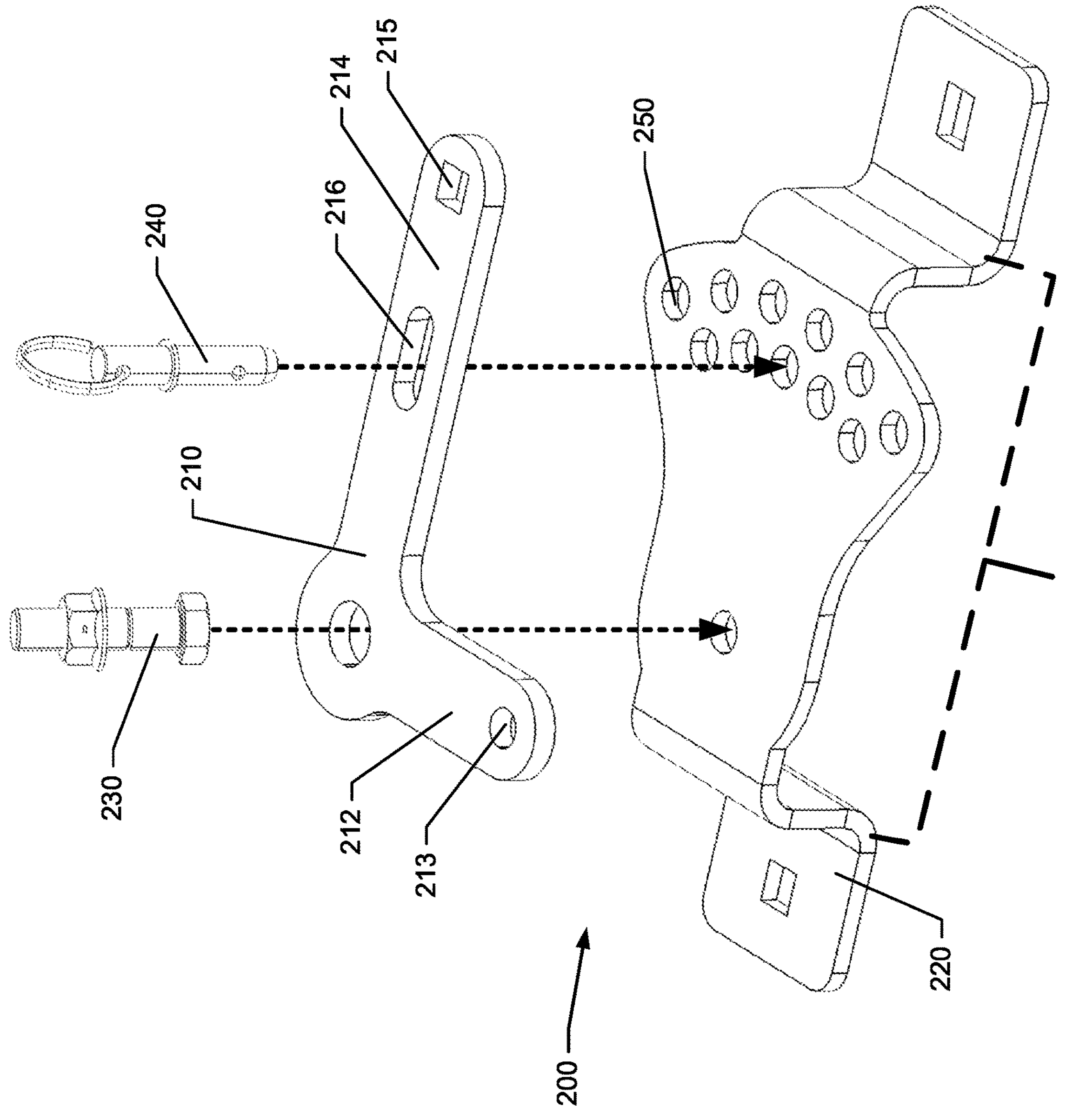
FIG. 7 illustrates an exploded perspective view of a tension keeping assembly in isolation according to an example embodiment.

FIGS. 6 and 7 depict an isolated view of the tension keeping assembly 200 according to an example embodiment and an isolated exploded view of the tension keeping assembly 200 according to an example embodiment, respectively. Referring now to FIGS. 6 and 7, the tension keeping assembly 200 may include a tension adjustment arm 210, a mounting bracket 220, a fastening member 230, and a pin 240. The mounting bracket 220 may operably couple the tension keeping assembly 200 to the cutting deck 140, and the fastening member 230 may pivotably operably couple the tension adjustment arm 210 to the mounting bracket 220. In this regard, the fastening member 230 may form a pivot axis about which the tension adjustment arm 210 may rotate. The mounting bracket 220 may include an elevated portion 222 that may be raised away from the top surface of the cutting deck 140. The elevated portion 222 may provide adequate space to accommodate a bottom portion of the fastening member 230, and the pin 240, so that neither the fastening member 230 nor the pin 240 are impeded by the top surface of the cutting deck 140.

In some embodiments, the tension adjustment arm 210 may be substantially L-shaped and therefore may include a first elongate member 212 and a second elongate member 214. In this regard, the first elongate member 212 and the second elongate member 214 may be disposed at roughly a 90 degree angle relative to each other. However, it should be appreciated that other arrangements and other angles could be defined in alternative embodiments. The fastening member 230 may be disposed at the intersection of the first elongate member 212 and the second elongate member 214 and may form a pivot axis about which the first and second elongate members 212 and 214 rotate or pivot. In some embodiments, the first elongate member 212 may be shorter than the second elongate member 214. In some cases, the first elongate member 212 may have a length approximately equal to 60% of the length of the second elongate member 214. In some other embodiments, the first elongate member 212 may have a length within a range of 50% to 80% of the length of the second elongate member 214. The first elongate member 212 may operably couple the tension keeping assembly 200 to the interface assembly 190, and more specifically, to the pull rod 196. In this regard, the first elongate member 212 may include an interface 213 at a distal end of the first elongate member 212 for receiving an end of the pull rod 196, or a fastener that operably couples the pull rod 196 to the first elongate member 212. On the other hand, the second elongate member 214 may temporarily operably couple the tension keeping assembly 200 to a torque wrench so that an operator may apply a desired torque (and tension level) to the belt tensioning assembly. In this regard, the second elongate member 214 may include the setting portion of the tension keeping assembly 200. As such, a torque wrench interface 215 may be disposed at a distal end of the second elongate member 214 for receiving a projection of the torque wrench. In some embodiments, the torque wrench interface 215 may be a square shaped aperture, which may be configured to receive a square shaped projection of the torque wrench. The torque wrench may thus operably couple with the torque wrench interface 215 of the setting portion, allowing the operator to apply a torque to the tension keeping assembly 200. As such, the force applied to the second elongate member 214 is thereby applied to the pull rod 196 and the rest of the belt tensioning assembly by way of the fastening member 230 and the first elongate member 212 of the tension adjustment arm 210. The torque applied by the torque wrench may set the desired torque for the belt tensioning assembly, but the tension in the drive belt 150 may change over time due to vibration of the components of the belt tensioning assembly. Thus, it may be desirable to provide structure to prevent this change over time. To accomplish this, the tension keeping assembly 200 may be structured such that the second elongate member 214 may further include the maintaining portion of the tension keeping assembly 200. The maintaining portion may include a pin slot 216 configured to receive the pin 240 therein to prevent movement of the tension adjustment arm 210 after the desired torque is set using the torque wrench. The pin slot 216 may be disposed on the second elongate member 214 between the torque wrench interface 215 and the fastening member 230, and may be substantially elliptical in shape.

In an example embodiment, the mounting bracket 220 may include a plurality of receiving orifices 250 disposed thereon. The receiving orifices 250 may accommodate the pin 240 responsive to the pin 240 being inserted into the pin slot 216. In this regard, in order to maintain a desired tension level within the drive belt 150, the pin 240 may be set into the pin slot 216 of the maintaining portion, and into a singular receiving orifice 250 out of the plurality of receiving orifices 250 as a stop mechanism to prevent rotation of the tension adjustment arm 210 relative to the mounting bracket 220. In this regard, the receiving orifices 250 may be arranged in an array, and in some embodiments, the array may include in two or more rows of receiving orifices 250. The array of receiving orifices 250 may be disposed in a curved pattern as if the second elongate member 214 has been swept across the mounting bracket 220 as the tension adjustment arm 210 rotates. In this regard, one of the receiving orifices 250 may line up with the pin 240 when the pin 240 is in the pin slot 216 for each torque setting that may be applied via the torque wrench. In some cases, when including two or more rows of receiving orifices 250, the size of the pin slot 216 may be accordingly enlarged to extend over each row of receiving orifices 250. Furthermore, in some embodiments comprising two or more rows of receiving orifices 250, each row may be offset from the previous row so that the receiving orifices 250 in the ensuing row align with spaces between consecutive receiving orifices 250 of the previous row. In this regard, the offset rows may provide more chances for the tension adjustment arm 210 to be held in an ideal position to maintain the operator's desired tension level. In other words, if the tension adjustment arm 210 is torqued to the desired tension level, and the pin 240 lines up between two consecutive receiving orifices 250 in a first row, then the pin 240 can be inserted into a receiving orifice 250 in an adjacent row to hold that precise position and tension level more accurately. In some embodiments, the pin 240 may include a ball and detent on the shaft of the pin 240 so that the pin 240 is secured in place in the receiving orifice 250 when inserted. When the pin 240 is removed from the receiving orifice 250, as indicated by arrow 260, the tension adjustment arm 210 may be free to rotate about the fastening member 230, as indicated by arrows 270 and 280.

Some example embodiments may provide for a belt tensioning assembly. The belt tensioning assembly may include a drive belt which may be configured to transfer torque from an engine, a pulley assembly which may guide the drive belt, a pulley adjustment arm which may be configured to move at least one pulley from the pulley assembly to adjust the tension level of the drive belt, a tension keeping assembly which may set and maintain a desired level of tension in the drive belt by moving the at least one pulley, and an interface assembly which may operably couple the tension keeping assembly to the pulley adjustment arm. The tension keeping assembly may include a setting portion at which the desired level of tension in the drive belt may be set and a retaining portion at which the desired level of tension in the drive belt may be maintained.

The belt tensioning assembly of some embodiments may include additional features, modifications, augmentations and/or the like to achieve further objectives or enhance performance of the belt tensioning assembly. The additional features, modifications, augmentations and/or the like may be added in any combination with each other. Below is a list of various additional features, modifications, and augmentations that can each be added individually or in any combination with each other. For example, the tension keeping assembly may further include a tension adjustment arm that may be configured to rotate to a desired tension level, a mounting bracket which may be operably coupled to a cutting deck, and a fastening member which may operably couple the tension adjustment arm to the mounting bracket. In some cases, the tension adjustment arm may include a first elongate member and a second elongate member. In an example embodiment, the first elongate member and the second elongate member may be substantially perpendicular. In some cases, the fastening member may operably couple the tension adjustment arm to the mounting bracket at an intersection of the first elongate member and the second elongate member. In an example embodiment, both the setting portion and the retaining portion of the tension keeping assembly may be disposed at the second elongate member. In some cases, the second elongate member may include a pin slot that may form the retaining portion and a torque wrench interface that may form the setting portion. In an example embodiment, the torque wrench interface may be configured to receive a projection from a torque wrench such that the torque wrench may be used to rotate the tension adjustment arm to the desired tension level. In some cases, the pin slot may be disposed between the fastening member and the torque wrench interface. In an example embodiment, the mounting bracket may include an array of receiving orifices. In some cases, each receiving orifice of the array of receiving orifices may correspond to a different tension level. In an example embodiment, a selected receiving orifice of the array of receiving orifices may be configured to receive a pin passed through the pin slot. In some cases, the array of receiving orifices may include a first row of receiving orifices and a second row of receiving orifices. In an example embodiment, the second row may include less receiving orifices than the first row. In some cases, each receiving orifice in the second row may align with a space between consecutive receiving orifices of the first row. In an example embodiment, each receiving orifice of the array of receiving orifices may correspond to a different tension level. In some cases, the selected receiving orifice of the array of receiving orifices may be configured to receive the pin. In an example embodiment, the pin slot may extend over the first row of receiving orifices and the second row of receiving orifices. In some cases, the mounting bracket may include an elevated portion that may extend away from the cutting deck. In an example embodiment, the first row and the second row may be disposed on the elevated portion. In some cases, the first elongate member may be operably coupled to a pull rod. In an example embodiment, the pull rod may be operably coupled to a bell crank. In some cases, the bell crank may be operably coupled to the pulley adjustment arm via a spring. In an example embodiment, the pulley adjustment arm may bias at least one pulley from the pulley assembly to adjust the amount of tension applied to the drive belt.

Some example embodiments may provide for a riding lawn care vehicle. The riding lawn care vehicle may include a frame to which wheels of the riding lawn care vehicle may be attachable, an engine which may be operably coupled to the frame and may provide power to the wheels and to at least one cutting blade of the riding lawn care vehicle, a cutting deck which may be operably coupled to the frame and may include the at least one cutting blade and a drive belt that may transfer torque from the engine to the at least one cutting blade, and a belt tensioning assembly which may apply tension to the drive belt to ensure the drive belt transfers torque from the engine to the at least one cutting blade. The belt tensioning assembly may include a tension keeping assembly to set and maintain a desired level of tension in the drive belt. The tension keeping assembly may include a setting portion at which the desired level of tension in the drive belt may be set and a retaining portion at which the desired level of tension in the drive belt may be maintained.

The riding lawn care vehicle of some embodiments may include additional features, modifications, augmentations and/or the like to achieve further objectives or enhance performance of the riding lawn care vehicle. The additional features, modifications, augmentations and/or the like may be added in any combination with each other. Below is a list of various additional features, modifications, and augmentations that can each be added individually or in any combination with each other. For example, the tension keeping assembly may further include a tension adjustment arm that may be configured to rotate to a desired tension level, a mounting bracket which may be operably coupled to a cutting deck, and a fastening member which may operably couple the tension adjustment arm to the mounting bracket. In some cases, the tension adjustment arm may include a first elongate member and a second elongate member. In an example embodiment, the first elongate member and the second elongate member may be substantially perpendicular. In some cases, the fastening member may operably couple the tension adjustment arm to the mounting bracket at an intersection of the first elongate member and the second elongate member. In an example embodiment, both the setting portion and the retaining portion of the tension keeping assembly may be disposed at the second elongate member. In some cases, the second elongate member may include a pin slot that may form the retaining portion and a torque wrench interface that may form the setting portion. In an example embodiment, the torque wrench interface may be configured to receive a projection from a torque wrench such that the torque wrench may be used to rotate the tension adjustment arm to the desired tension level. In some cases, the pin slot may be disposed between the fastening member and the torque wrench interface. In an example embodiment, the mounting bracket may include an array of receiving orifices. In some cases, each receiving orifice of the array of receiving orifices may correspond to a different tension level. In an example embodiment, a selected receiving orifice of the array of receiving orifices may be configured to receive a pin passed through the pin slot. In some cases, the array of receiving orifices may include a first row of receiving orifices and a second row of receiving orifices. In an example embodiment, the second row may include less receiving orifices than the first row. In some cases, each receiving orifice in the second row may align with a space between consecutive receiving orifices of the first row. In an example embodiment, each receiving orifice of the array of receiving orifices may correspond to a different tension level. In some cases, the selected receiving orifice of the array of receiving orifices may be configured to receive the pin. In an example embodiment, the pin slot may extend over the first row of receiving orifices and the second row of receiving orifices. In some cases, the mounting bracket may include an elevated portion that may extend away from the cutting deck. In an example embodiment, the first row and the second row may be disposed on the elevated portion. In some cases, the first elongate member may be operably coupled to a pull rod. In an example embodiment, the pull rod may be operably coupled to a bell crank. In some cases, the bell crank may be operably coupled to the pulley adjustment arm via a spring. In an example embodiment, the pulley adjustment arm may bias at least one pulley from the pulley assembly to adjust the amount of tension applied to the drive belt.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A belt tensioning assembly for applying tension to a drive belt, the belt tensioning assembly comprising:

a drive belt configured to transfer torque from an engine;

a pulley assembly to guide the drive belt;

a pulley adjustment arm configured to move at least one pulley from the pulley assembly to adjust the tension level of the drive belt;

a tension keeping assembly to set and maintain a desired level of tension in the drive belt by moving the at least one pulley; and an interface assembly to operably couple the tension keeping assembly to the pulley adjustment arm, wherein the tension keeping assembly comprises a setting portion at which the desired level of tension in the drive belt is set and a retaining portion at which the desired level of tension in the drive belt is maintained, and wherein the tension keeping assembly further comprises:

a tension adjustment arm configured to rotate to a desired tension level;

a mounting bracket operably coupled to a cutting deck; and a fastening member operably coupling the tension adjustment arm to the mounting bracket.

2. The belt tensioning assembly of claim 1, wherein the tension adjustment arm comprises a first elongate member and a second elongate member, wherein the first elongate member and the second elongate member are substantially perpendicular, wherein the fastening member operably couples the tension adjustment arm to the mounting bracket at an intersection of the first elongate member and the second elongate member, and wherein both the setting portion and the retaining portion of the tension keeping assembly are disposed at the second elongate member.

3. The belt tensioning assembly of claim 2, wherein the second elongate member comprises a pin slot forming the retaining portion and a torque wrench interface forming the setting portion, wherein the torque wrench interface is configured to receive a projection from a torque wrench such that the torque wrench can be used to rotate the tension adjustment arm to the desired tension level, and wherein the pin slot is disposed between the fastening member and the torque wrench interface.

4. The belt tensioning assembly of claim 1, wherein the mounting bracket comprises an array of receiving orifices, wherein each receiving orifice of the array of receiving orifices corresponds to a different tension level, and wherein a selected receiving orifice of the array of receiving orifices is configured to receive a pin passed through the pin slot.

5. The belt tensioning assembly of claim 4, wherein the array of receiving orifices comprises a first row of receiving orifices and a second row of receiving orifices, wherein the second row comprises less receiving orifices than the first row, wherein each receiving orifice in the second row aligns with a space between consecutive receiving orifices of the first row, wherein each receiving orifice of the array of receiving orifices corresponds to a different tension level, and wherein the selected receiving orifice of the array of receiving orifices is configured to receive the pin.

6. The belt tensioning assembly of claim 5, wherein the pin slot extends over the first row of receiving orifices and the second row of receiving orifices.

7. The belt tensioning assembly of claim 5, wherein the mounting bracket comprises an elevated portion that extends away from the cutting deck, and wherein the first row and the second row are disposed on the elevated portion.

8. The belt tensioning assembly of claim 2, wherein the first elongate member is operably coupled to a pull rod, wherein the pull rod is operably coupled to a bell crank, and wherein the bell crank is operably coupled to the pulley adjustment arm via a spring.

9. The belt tensioning assembly of claim 8, wherein the pulley adjustment arm biases at least one pulley from the pulley assembly to adjust the amount of tension applied to the drive belt.

10. A riding lawn care vehicle comprising:

a frame to which wheels of the riding lawn care vehicle are attachable;

an engine operably coupled to the frame, wherein the engine provides power to the wheels and to at least one cutting blade of the riding lawn care vehicle;

a cutting deck operably coupled to the frame and comprising the at least one cutting blade and a drive belt, wherein the drive belt transfers torque from the engine to the at least one cutting blade; and a belt tensioning assembly for applying tension to the drive belt to ensure the drive belt transfers torque from the engine to the at least one cutting blade, wherein the belt tensioning assembly comprises a tension keeping assembly to set and maintain a desired level of tension in the drive belt, wherein the tension keeping assembly comprises a setting portion at which the desired level of tension in the drive belt is set and a retaining portion at which the desired level of tension in the drive belt is maintained, and wherein the tension keeping assembly further comprises:

a tension adjustment arm configured to rotate to a desired tension level;

a mounting bracket operably coupled to the cutting deck; and a fastening member operably coupling the tension adjustment arm to the mounting bracket.

11. The riding lawn care vehicle of claim 10, wherein the tension adjustment arm comprises a first elongate member and a second elongate member, wherein the first elongate member and the second elongate member are substantially perpendicular, wherein the fastening member operably couples the tension adjustment arm to the mounting bracket at an intersection of the first elongate member and the second elongate member, and wherein both the setting portion and the retaining portion of the tension keeping assembly are disposed at the second elongate member.

12. The riding lawn care vehicle of claim 11, wherein the second elongate member comprises a pin slot forming the retaining portion and a torque wrench interface forming the setting portion, wherein the torque wrench interface is configured to receive a projection from a torque wrench such that the torque wrench can be used to rotate the tension adjustment arm to the desired tension level, and wherein the pin slot is disposed between the fastening member and the torque wrench interface.

13. The riding lawn care vehicle of claim 10, wherein the mounting bracket comprises an array of receiving orifices, wherein each receiving orifice of the array of receiving orifices corresponds to a different tension level, and wherein a selected receiving orifice of the array of receiving orifices is configured to receive a pin passed through the pin slot.

14. The riding lawn care vehicle of claim 13, wherein the array of receiving orifices comprises a first row of receiving orifices and a second row of receiving orifices, wherein the second row comprises less receiving orifices than the first row, wherein each receiving orifice in the second row aligns with a space between consecutive receiving orifices of the first row, wherein each receiving orifice of the array of receiving orifices corresponds to a different tension level, and wherein the selected receiving orifice of the array of receiving orifices is configured to receive the pin.

15. The riding lawn care vehicle of claim 14, wherein the pin slot extends over the first row of receiving orifices and the second row of receiving orifices.

16. The riding lawn care vehicle of claim 14, wherein the mounting bracket comprises an elevated portion that extends away from the cutting deck, and wherein the first row and the second row are disposed on the elevated portion.

17. The riding lawn care vehicle of claim 11, wherein the first elongate member is operably coupled to a pull rod, wherein the pull rod is operably coupled to a bell crank, and wherein the bell crank is operably coupled to the pulley adjustment arm via a spring.

18. The riding lawn care vehicle of claim 17, wherein the pulley adjustment arm biases at least one pulley from the pulley assembly to adjust the amount of tension applied to the drive belt.

* * * * *